United States Patent [19]

Puncochar

[11] Patent Number: 4,649,776

[45] Date of Patent: Mar. 17, 1987

[54] EXTENSION FOR SOCKET TOOL DRIVE SYSTEM

[76] Inventor: Norbert L. Puncochar, 460 Phirne Ct. East, Glen Burnie, Md. 21061

[21] Appl. No.: 770,057

[22] Filed: Aug. 27, 1985

[51] Int. Cl.[4] .......................... B25B 17/00; F16H 55/00; F16H 37/06

[52] U.S. Cl. .......................................... 81/57.3; 74/433; 74/665 E

[58] Field of Search ..................... 74/413, 433, 665 B, 74/665 E, 665 G; 81/57, 57.14, 57.3

[56] References Cited

U.S. PATENT DOCUMENTS

| | | | |
|---|---|---|---|
| 2,817,256 | 12/1957 | Malone et al. | 81/57.3 |
| 2,863,347 | 12/1958 | Nelson | 81/57 X |
| 3,535,960 | 10/1970 | Borries | 81/57.14 |
| 4,374,479 | 2/1983 | Minotti | 81/57.3 |

*Primary Examiner*—Frederick R. Schmidt
*Assistant Examiner*—Maurina Rachuba
*Attorney, Agent, or Firm*—Shlesinger, Arkwright, Garvey & Fado

[57] ABSTRACT

A torque transmitting wrench assembly comprises a plurality of serially arranged gears positioned between a first tool gear and a second tool gear in a housing. Each of the serially arranged gears includes gear teeth defining an outer idler gear tooth perimeter and at least one annular peripheral bearing surface with a perimeter substantially the same as the outer idler gear tooth perimeter. The housing is formed of two parts and includes at least one recess having an arcuate periphery, for receiving the bearing surface.

19 Claims, 11 Drawing Figures

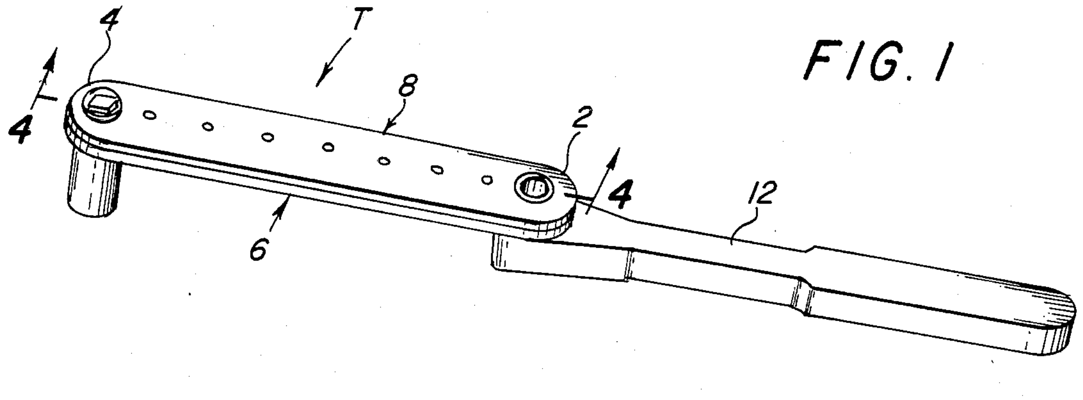
FIG. 1
FIG. 2
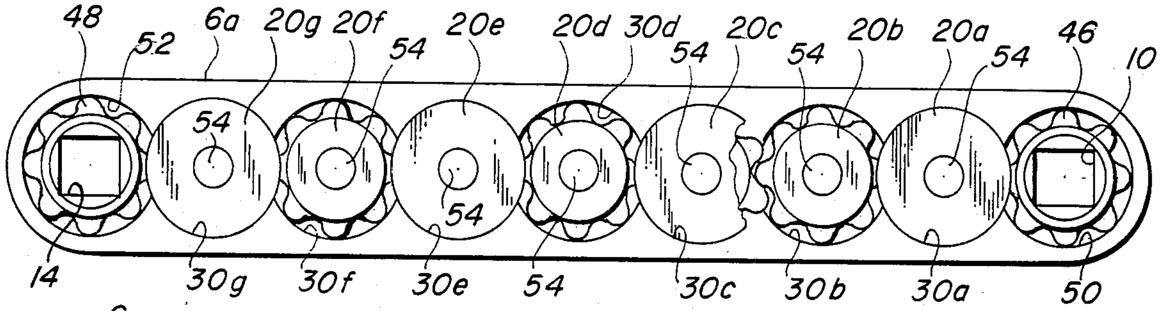
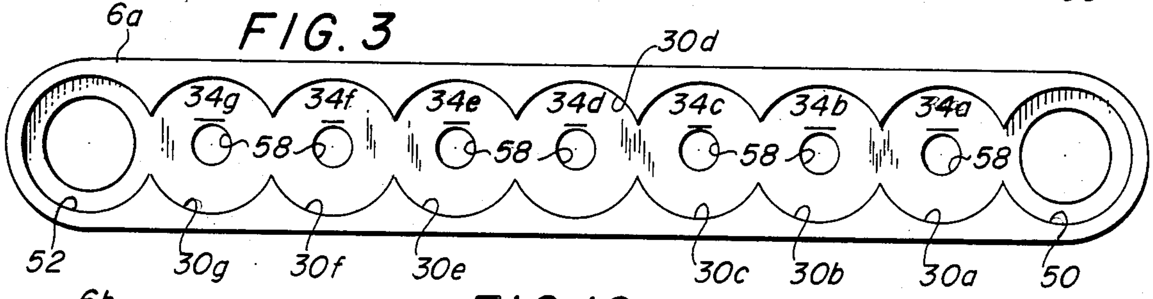
FIG. 3
FIG. 10
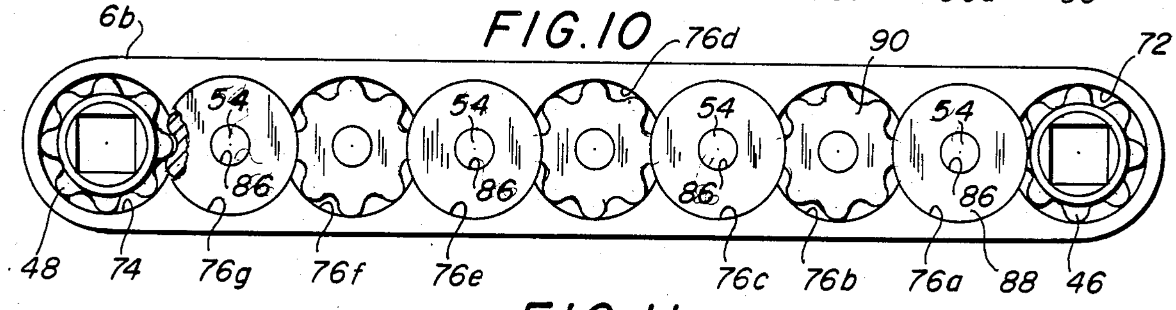
FIG. 11
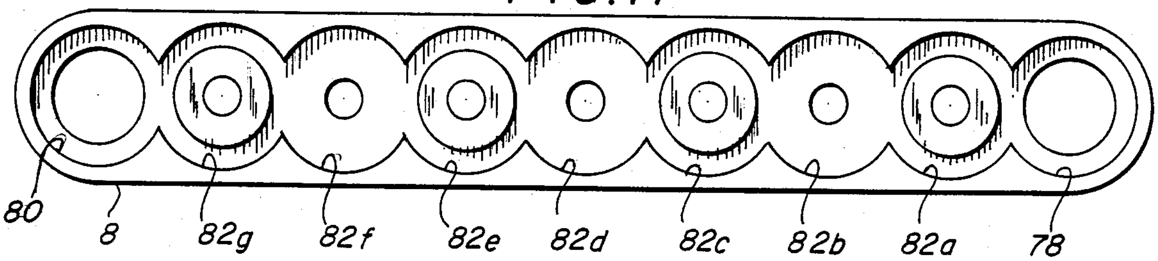

FIG. 4
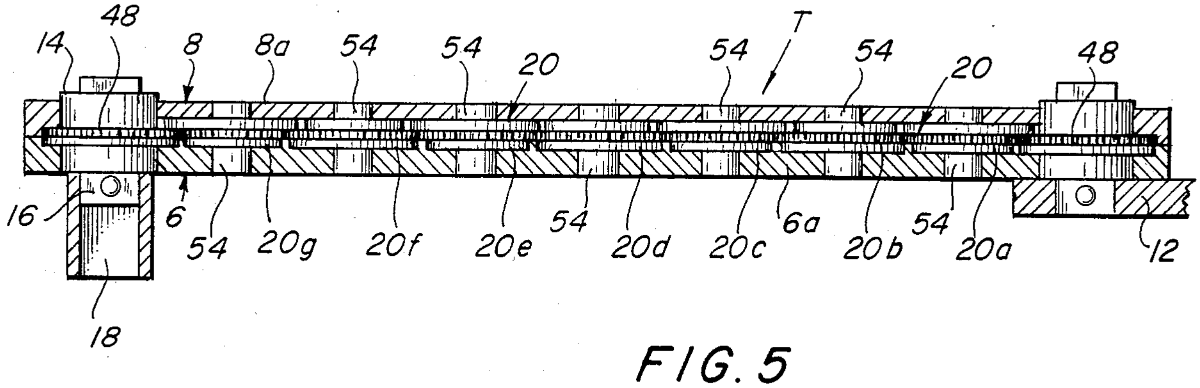
FIG. 5
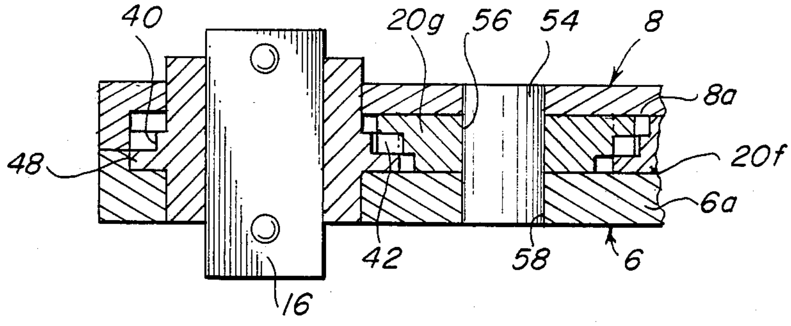
FIG. 6
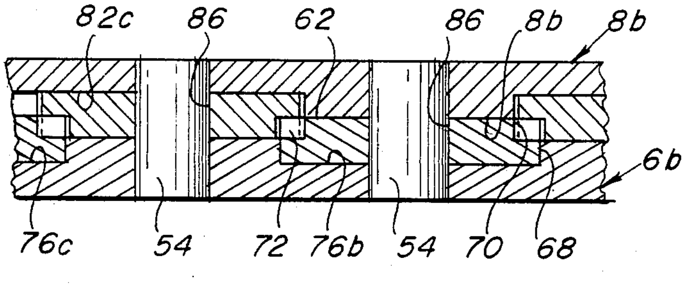
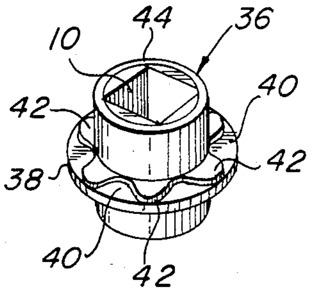
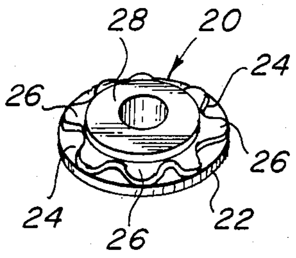
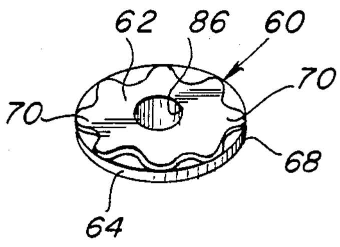
FIG. 7 FIG. 8 FIG. 9

EXTENSION FOR SOCKET TOOL DRIVE SYSTEM

BACKGROUND OF THE INVENTION

The present invention relates to a tool which is used to apply a torque to a nut, bolt, screw or the like for purposes of installing or removing the nut, bolt screw, or other parts situated in places inaccessible to ordinary hand tools. The device of the invention is especially useful in conjunction with the assembly or repair of airplanes or motor vehicles or in any location which is restricted in access to conventional socket wrench sets, screwdrivers, and adjustable wrenches.

Several devices have been proposed for providing a remote driver to apply torque to a nut or bolt through a gear train or chain. U.S. Pat. No. 4,374,480 to Diaz teaches an extension wrench for transmitting a torque to a fastener. The extension wrench comprises an elongated frame, housing a driven gear at one end, a driving gear at the opposite end and a meshing gear train between the driving gear and driven gears which transmits torque from the driving gear to the driven gear. The gears have no shafts for support but instead, each gear is inserted into a closely fitting circular recess in the elongated frame. By this design, the peripheral edge of each gear bears against the close fitting circular recess. The consequence of this gear recess arrangement is that clearances must be provided between the ends of the teeth of the gear and the recess. This allows the gear to move slightly, thereby, bearing unevenly against the recess wall. Further, the misalignment of these gears causes a shift of the entire load to one edge of the tooth with resulting excessive stress being created.

U.S. Pat. No. 4,374,479 to Minotti teaches a tool for transmitting torque from a driving member to a work piece and comprises a plurality of serially engaging gears. In Minotti, gears bear both on central shafts, about which each gear rotates, and also on a coaxial cylindrical shoulder extending outwardly from opposites sides of otherwise flat generally circular surfaces of the gears. A housing having an upper part, and a lower part each with a recess for receiving the shoulder portion, includes holes to receive the central shaft about which the gears rotate. A major drawback of the tool taught by Minotti is that the frame or housing supporting the gear frame is open, thereby allowing dirt or metal chips to enter the gear train and aggravate wear and breakage of the gear system. Further, bolting down the housing parts of Minotti increases the sliding friction at the bearing surface of the gears, thereby causing the device to be inefficient.

SUMMARY AND OBJECTS OF THE INVENTION

It is an object of the invention to provide a new and improved wrench to reach a nut or bolt with restricted access, where conventional wrenches are not practical to use because of lack of clearance.

It is another object of the invention to provide a new and improved gear, for a wrench assembly, wherein gear teeth are cut into a disk only on one side so that the second side may act as a bearing.

Still another object of the present invention is to provide a new and improved gear for a wrench assembly, which gear operates within the wrench assembly in a smooth and vibrationless manner.

Another object of the present invention is to provide a wrench assembly having gears which are configured so as to have optimum strength, optimum fatigue, and wear properties when used in the wrench assembly.

It is another object of the invention to provide a torque transfer device having first and second housing parts and a gear train, wherein the gears are designed to fit within the housing such as to insure ease of manufacture and ease of inspection of the gear train within the housing.

Yet another object of the present invention is to provide a torque transfer device for transmitting torque from a driving member to a work piece, the device including housing parts having annular recesses therein which act as bearing surfaces for gears in a gear train.

Still another object of the invention is to provide a torque transfer device, for use with wrenches, having housing parts with recesses to accept gears wherein, the recesses are identical and are adapted to receive a gear and act as a bearing surface for the gears bearing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE DRAWINGS

In the drawings:

FIG. 1 is a perspective view showing the torque transfer device of the invention, a driver device for applying torque and a socket device for engagement with a bolt or the like;

FIG. 2 is a top plan view of a torque transfer device of a first embodiment of the invention, with the top housing part removed;

FIG. 3, is a plan view of a housing part of the torque transfer of a first embodiment of the invention;

FIG. 4 is a sectional view of a first embodiment of the present invention.

FIG. 5 is a detailed sectional view showing a driven or drive gear engaging an idler gear of the embodiment of FIG. 4;

FIG. 6 is a sectional view of another embodiment of the invention;

FIG. 7 is a perspective view of a driven or drive gear of both embodiments of the invention;

FIG. 8 is a perspective view of an idler gear of the embodiment of FIG. 4;

FIG. 9 is a perspective view of an idler gear of the embodiment of FIG. 6;

FIG. 10 is a top plan view of a torque transfer device of the embodiment of FIG. 6, with the top housing part removed; and, FIG. 11 is a plan view of a housing part of the torque transfer device shown in FIG. 6.

DETAILED DESCRIPTION OF THE INVENTION

Referring now in detail to FIG. 1, there is illustrated a torque wrench assembly or torque transfer device T having a first end 2 and a second end 4. Torque wrench assembly T is formed of a lower housing portion 6 and a cooperating upper housing portion 8. At first end 2 of the torque converter assembly T there is a multi-faceted central hole 10, which can be square or hexagonal in crosssection, and which is adapted for receiving conventional socket set drivers, extension shafts, wrenches and screwdrivers. In FIG. 1, a conventional socket set driver 12 is shown. At second end 4 of torque wrench assembly T there is a multi-faceted hole 14 which can be of square of hexagonal cross-section. The hole 14 is adapted for receiving a stud member or the like 16, as best shown in FIG. 4 which snaps into the multi-faceted hole 14 so as to be positioned to receive a socket member 18 which snaps on said member 16. Socket set driver 12, stud member 16 and socket member 18 need not be further described as they are available and are in common use by persons with ordinary skill as a mechanic.

FIGS. 2, 3, 4, 5, and 8

Referring now in detail to FIGS. 2, 3, 4, 5 and 8, a torque wrench assembly is shown having idler disks or idler gears 20. As best shown in FIG. 8, idler gear 20 includes an annular peripheral bearing surface 22, cut-out portions 24 forming gear teeth 26 and reduced bearing surface 28. As is best seen in FIG. 2, idler gears 20*a*, 20*b*, 20*c*, 20*d*, 20*e*, 20*f* and 20*g* are positioned within idler gear recesses 30*a*, 30*b*, 30*c*, 30*d*, 30*e*, 30*f* and 30*g*, respectively. Idler gear 20*a* is positioned within lower housing portion 6*a* so that the reduced bearing surface 28 of idler gear 20*a* is within recess 30*a*. Idler gear 20*b* is positioned within housing portion 6*a* so that annular peripheral bearing surface 22 of idler gear 20*b* is within recess 30*b*. Idler gear 20*c*, 20*e* and 20*g* are positioned within housing portion 6*a* with an orientation similar to that of idler gear 20*a*. Idler gears 20*d* and 20*f* are positioned within housing 6*a* with an orientation similar to that of idler gear 20*b*. By this arrangement, gears 20*b*, 20*d* and 20*f* are positioned so that the annular peripheral bearing surface 22 of each idler gear 20*b*, 20*d* and 20*f* bear against respective bearing surfaces 32*b*, 32*d*, and 32*f*. Idler gears 20*a*, 20*c*, 20*e* and 20*g* are seated within respective recesses so that the reduced bearing surface 28 of each of the idler gears is seated on respective recess base portions 34*a*, 34*c*, 34*d* and 34*g*.

FIG. 7 shows a tool receiving gear 36 having an annular peripheral bearing surface 38, cut-out portions 40 and gear teeth 42. A reduced bearing portion or shaft portion 44 is provided with multifaceted hole 10 extending through shaft 44.

As can best be seen in FIG. 2, a first tool receiving gear 46 and a second tool receiving gear 48 are positioned within respective tool gear recesses 50 and 52 of lower housing portion 6*a*. By this arrangement, when first tool gear 46 is rotated, gear teeth 42 of first tool gear 46 engage gear teeth 26 of idler gear 20*a*. Gear teeth 26*a* of idler gear 20*a* in turn engage gear teeth 26*b* of idler gear 20*b*. Idler gears 20*c*, 20*d*, 20*f* and 20*g* engage neighboring idler gears in a manner similar to that described with reference to idler gears a and b. This arrangement, produces a gear train which causes second tool gear 48 to rotate. If an odd number of idler gears are employed, the rotation of second tool gear 48 will be in the same direction as first tool gear 46.

Each idler gear 20 preferably includes a coaxial shaft 54 which may be press-fit into a shaft or receiving hole 56 in idler gear 20, as best shown in FIG. 5. Upper housing portion 6*a* and lower housing portion 8*a* each include a plurality of shaft receiving holes 58 which are centered relative to each idler recess 30. The torque transmitting device T is assembled as follows: coaxial shafts 54 are press-fit into respective idler gears 20; each idler gear 20 is then positioned within respective idler gear recess 30 so that coaxial shaft 54 is received by shaft receiving hole 56; next, first tool gear 46 is positioned within recess 50 and second tool gear 48 is positioned within recess 52; housing portion 8*a* is then mated with housing portion 6*a* so that shafts 54 extend through shaft receiving holes 56 of housing portion 8*a*. Housing portion 8*a* may be fastened to housing portion 6*a* by means of screws, bolts, welds or the like.

FIGS. 6, 7, 9, 10 and 11

A second embodiment of the invention includes disk or gear member 60, lower housing portion 6*b*, upper housing portion 8*b*, first tool gear 46 and second tool gear 48. First tool gear 46 and second tool gear 48 are identical to tool gears 46 and 48 discussed above.

Gear member 60 includes a gear part 62 and a disk part 64. Disk part 64 forms an annular peripheral bearing surface 68 having a width approximately one-half of the width of gear disk member 60. Gear part 62 has a flat top surface with gear teeth 70 formed about the periphery of the top part. The depth of the gear part and depth of the gear teeth is approximately equal to the width of the disk part 64. The outermost portion of the gear teeth define an outer gear tooth perimeter which is substantially the same as the perimeter of the annular peripheral bearing surface 68.

Housing parts 6*b* and 8*b* are best shown in FIGS. 10 and 11 respectively. Housing part 6*b* includes outer recesses or first and second tool gear recesses 72 and 74. Between outer gear recesses 72 and 74 there are preferably an odd number of idler gear recesses 76*a* through 76*g*. An odd number of idler gear recesses is preferred so that, when gear member 60 and tool gear members 46 and 48 are placed within the housing, the rotation of first tool gear 46 will cause a rotation of second tool gear 48 in the same direction as first tool gear 46. Tool recesses 76*a* through g are formed with a diameter slightly larger than the diameter of disk part 64. Idler gear recesses 76*a* through 76*g* overlap one another and are preferably of two different depths. For example, recess 76*a*, adjacent tool gear recess 72, may be of a first depth substantially equal to the depth of tool gear recess 72 and overlap gear recess 72 a distance substantially equal to the length of gear tooth 70. Idler gear recess 76*b*, adjacent idler tooth gear recess 76*a*, may have a depth shallower than the depth of idler tooth gear recess 76*a* by a distance equal to the width of disk part 64. Idler tooth gear recesses 76*d*, 76*e*, 76*f* and 76*g* alternate in a similar fashion between recesses having a depth equal to the depth of recess A and recesses with a second depth equal to recess B. For instance, in FIG. 10, recesses 76*c*, 76*e*, and 76*g* are of the same depth as recess 76*a* and recesses 76*d* and 76*f* are of the same depth as recess 76*b*.

Housing portion 8*b* is similar to housing 6*b* in that there are two tool gear recesses 78 and 80 and an odd number of idler gear recesses 82*a* through 82*g*. However, the depth of idler tooth gear recesses 82*a* through 82*g* alternative in a manner which is just the opposite of the idler gear recesses of housing part 6*b*. For example, idler gear recess 82*a* has a depth which is shallower than that of adjacent tool gear recess 78 by a distance equal to the width of disk part 64. Idler gear recess 82*b* overlaps idler gear recess 82*a* and has a depth equal to the depth of tool gear recess 78. Idler gear recess 82*c*, 82*e*, and 82*g* each have a depth substantially the same as idler gear recess 82*a*. Idler gear recesses 82*d* and *f* have a depth substantially the same as idler gear recess 82*b*.

The device is assembled by press-fitting shaft 54 into a shaft receiving hole 86 formed in each of the idler gear members 60. The idler gear member 60 and associated coaxial shaft 54 are then positioned within housing parts **8*b* in respective idler gear recesses 82*a*** through *g*. For example, a first idler gear 88 may be positioned within idler gear recess **82*a* so that gear part 62 of the idler gear 88 is adjacent the base of idler gear recess 82*a*. A second idler gear 90 may be positioned within idler gear recess 82*b* so that the disk part 64 of idler gear 90 lies adjacent the base of idler gear recess 82*b*. In this manner, the idler gears 60 are positioned within housing portion 8*b* so that they alternate between having gear part 62 set adjacent the base portion of the recess and having the disk part 64 adjacent the base of the recess of housing part 8*b*. Tool gears 46 and 48 are positioned within tool gear recesses 78 and 80 respectively. Housing part 6*b* is then joint with housing part 8*b* so that first tool gear 46, second tool gear 48 and idler gear 60 are each confined to associated gear recesses within housing parts 8*b* and 6*b***.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What is claimed is:

1. A torque transfer device, comprising:

(a) first and second elongated housing parts, each of said housing parts having a driven end portion and a driving end portion;

(b) a plurality of aligned cooperating recesses extending between said driven end portion and said driving end portion of each housing part providing a plurality of paired aligned recesses when said housing parts are secured together;

(c) first and second drive gear means, each of said drive gear means including a disk having first and second spaced apart parallel surfaces and a plurality of cut-out portions adjacent the periphery of each disk, said cut-out portions extending through each first surface and terminating short of the associated second surface and thereby providing a plurality of gear teeth means disposed about each said disk;

(d) said first drive gear means rotatably mounted in the paired penultimate recesses of said driving end portions;

(e) said second drive gear means rotatably mounted in the paired penultimate recesses of said driven end portions;

(f) a plurality of idler gear means, each of said idler gear means including a disk having third and fourth spaced apart parallel surfaces and a plurality of cut-out portions adjacent the periphery of each said disk, said cut-out portions extending through each said third surface and terminating short of the associated fourth surface and thereby providing a plurality of gear teeth means disposed about each idler gear means disk;

(g) each of said idler gear means rotatably mounted in one of the remaining paired recesses and said idler gear means and said drive gear means disposed in an alternating meshing sequence so that rotation of said first drive drive gear means causes cooperative rotation of all other gear means and thereby of said second drive gear means;

(h) means associated with said first drive gear means for causing rotation thereof; and, (i) means associated with said second drive gear means for connection with a part to be rotated.

2. The device of claim 1, wherein:

(a) each of said recesses having a central aperture; and, (b) a pin extending from each of said gear means gear means and having a portion received in the associated aperture.

3. The device of claim 2, wherein:

(a) the apertures of the penultimate recesses of said housing parts having a diameter exceeding that of the other apertures.

4. The device of claim 2, wherein:

(a) each of said housing parts having a longitudinal axis and said apertures disposed transverse thereto.

5. The device of claim 1, wherein:

(a) there being an odd number of said idler gear means so that said drive gear means have common directional rotation.

6. The device of claim 1, wherein:

(a) said recesses having a common diameter and each recess overlapping the adjacent recesses.

7. The device of claim 1, wherein:

(a) each of said gear teeth means having an upper planar surface intermediate to and parallel the associated parallel surfaces.

8. The device of claim 1, wherein:

(a) said drive gear teeth means not extending beyond the periphery of the associated first surface and said idler gear teeth means not extending beyond the periphery of the associated third surface.

9. The device of claim 1, wherein:

(a) said idler gear teeth means having an upper planar surface providing said fourth surface.

10. The device of claim 1, wherein:

(a) each of said gear receiving recesses having a planar wall portion providing an associated housing part bearing surface;

(b) said housing parts each having a mating surface extending parallel to the associated wall portion; and, (c) the wall portions providing the housing part bearing surfaces for receiving the second and fourth surfaces being spaced from the associated mating surfaces a distance less than that of the wall portions providing the housing part bearing surfaces for receiving the first and third surfaces.

11. The device of claim 1, wherein:

(a) said means for causing rotation including means for receiving a torque wrench assembly.

12. The device of claim 1, wherein:

(a) said means for connection including socket member means.

13. A torque transfer device, comprising:

(a) first and second elongated cooperating housing parts, each housing part having a driving end portion and a driven end portion;

(b) each of said driven end portions including an annular driven end recess and each of said driving end portions including an annular driving end recess and each of said recesses providing a housing part bearing surface;

(c) a plurality of aligned annular idler gear recesses extending between said driving and driven end recesses and each recess overlapping the adjacent recesses and providing a housing part bearing surface and the recesses of said first housing part aligned with the recesses of said second housing part for providing paired aligned idler, driven and driving end recesses when said housing parts are secured together;

(d) each of said recesses having a central aperture therethrough and aaid driven and driving end portion recess apertures having a diameter exceeeding the uniform diameter of said idler recess apertures;

(e) a plurality of idler gear means, each of said idler gear means rotatably mounted in one of said paired edler gear recesses and each idler gear means having gear teeth means engaged with the gear teeth means of the adjacent idler gear means for providing a drive train;

(f) each of said idler gear means including a disk comprising a first planar annular surface spaced from a second planar parallel annular surface and said second surface having an area less than the area of the associated first surface and a plurality of cut-out portions adjacent the periphery of each disk extending through each first surface and terminating short of the associated second surface for providing said gear teeth means and said gear teeth means being angularly disposed about each of said idler gear means;

(g) said idler gear means disposed in the associated paired idler recesses in an alternating meshing sequence so taht the first surface of a first idler gear means rests upon the housing part bearing surface of the associated first housing part recess and the second surface thereof rests upon the housing part bearing surface of the associated second housing part recess while the first surface of the immediately adjacent idler gear means rests upon the housing part bearing surface of the associated second housing part recess and the second surface thereof rests upon the housing part bearing surface df the associated first housing part recess;

(h) a drive gear means including a disk having a third planar surface and a fourth parallel planar recuced area surface and including a plurality of cut-out portions adjacent the periphery of said drive gear means disk extending through said third surface and terminating short of said fourth surface and providing gear teeth means for said driver gear means rotatably mounted in said paired driving end portion recesses so that said third surface thereof rests upon said first housing part driving end recess bearing surface and said fourth surface thereof rests upon said second housing part driving end recess bearing surface and said driver gear teeth means meshed with the gear teeth means of the adjacent idler gear means so that rotation of said driver gear means causes associated rotation of the adjacent idle gear means and thereby of all idler gear means;

(i) means for rotating said driver gear means;

(j) a driven gear means including a disk having a fifth planar surface and a sixth planar parallel reduced are a surface and a plurality of cut-out portions adjacent the periphery of said driven gear means disk extending through said fifth surface and terminating short of said sixth surface and providing gear teeth means for said driven gear means rotatably mounted in said paired driven end recesses so that the fifth surface thereof bears upon said first housing part driven end recess bearing surface and said sixth surface thereof bears upon said second housing part driven end recess bearing surface and said driven gear teeth means meshed with the gear teeth means of the adjacent idler gear means so that said driven gear means is rotated by rotation of the adjacent idler gear means; and, (k) means associated with said driven gear means for connection to an item to be rotated.

14. The device of claim 13, wherein:

(a) said idler gear teeth means having a planar portion disposed intermediate of and parallel to the associated first and second idler gear surfaces.

15. The device of claim 13, wherein:

(a) a shaft extending from each of said idler gear means beyond the associated first and second surfaces and said shafts each having end portions received in the associated housing part recess apertures.

16. The device of claim 14, wherein:

(a) each housing part having a planar mating surface contiguous with the associated mating surface of the other housing part;

(b) each of said recesses having a wall portion providing the associated housing part bearing surface and extending parallel to the associated housing part mating surface; and, (c) said wall portions being spaced a uniform distance from the associated housing part mating surface.

17. The device of claim 13, wherein:

(a) said idler gear teeth means having a planar surface portion providing said second surface.

18. The device of claim 17, wherein:

(a) each recess having a planar wall portion providing the associated housing part bearing surface;

(b) each housing part having a planar mating surface contiguous with the associated mating surface of the other housing part and extending parallel to the associated wall portions; and, (c) said wall portions providing said housing part bearing surfaces for said idler gear means second surfaces being spaced from the associated mating surfaces a distance less than the distance the wall portions providing the housing part bearing surfaces for said idler gear means first surfaces are from the associated mating surfaces.

19. The device of claim 13, wherein:

(a) said means for rotating including means for receiving a torque wrench means; and, (b) said means for connection including a socket assembly means.

* * * * *